United States Patent
Dhanakshirur et al.

(10) Patent No.: US 9,129,599 B2
(45) Date of Patent: Sep. 8, 2015

(54) AUTOMATED TUNING OF SPEECH RECOGNITION PARAMETERS

(75) Inventors: Girish Dhanakshirur, Delray Beach, FL (US); Baiju D. Mandalia, Boca Raton, FL (US); Wendi L. Nusbickel, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 1942 days.

(21) Appl. No.: 11/874,230

(22) Filed: Oct. 18, 2007

(65) Prior Publication Data

US 2009/0106028 A1 Apr. 23, 2009

(51) Int. Cl.
- G10L 15/06 (2013.01)
- G10L 15/02 (2006.01)
- G10L 17/04 (2013.01)
- G10L 15/065 (2013.01)
- G10L 15/20 (2006.01)
- G10L 15/30 (2013.01)
- G10L 17/26 (2013.01)

(52) U.S. Cl.
CPC .............. *G10L 15/065* (2013.01); *G10L 15/02* (2013.01); *G10L 15/20* (2013.01); *G10L 15/30* (2013.01); *G10L 15/06* (2013.01); *G10L 17/04* (2013.01); *G10L 17/26* (2013.01)

(58) Field of Classification Search
USPC ......... 704/200–210, 231–232, 234, 236–257, 704/270.1, 275, E17.001–E17.016, 704/E21.001–E21.02, E11.001–E11.007
See application file for complete search history.

(56) References Cited

U.S. PATENT DOCUMENTS

| | | | | |
|---|---|---|---|---|
| 5,632,002 A * | 5/1997 | Hashimoto et al. | ........... | 704/231 |
| 5,673,362 A * | 9/1997 | Matsumoto | ................... | 704/260 |
| 5,850,627 A * | 12/1998 | Gould et al. | .................. | 704/231 |
| 5,889,845 A * | 3/1999 | Staples et al. | ............ | 379/211.02 |
| 5,897,616 A * | 4/1999 | Kanevsky et al. | ............. | 704/246 |
| 5,937,384 A * | 8/1999 | Huang et al. | .................. | 704/256 |
| 6,092,043 A * | 7/2000 | Squires et al. | ................ | 704/251 |
| 6,092,044 A * | 7/2000 | Baker et al. | ................... | 704/254 |
| 6,292,779 B1 * | 9/2001 | Wilson et al. | ................. | 704/257 |
| 6,442,519 B1 * | 8/2002 | Kanevsky et al. | ............. | 704/243 |
| 6,539,359 B1 * | 3/2003 | Ladd et al. | .................... | 704/275 |
| 6,973,489 B1 * | 12/2005 | Levy | .............................. | 709/224 |
| 7,243,071 B1 * | 7/2007 | Resnick et al. | ............... | 704/257 |
| 7,623,648 B1 * | 11/2009 | Oppenheim et al. | ...... | 379/218.01 |

(Continued)

FOREIGN PATENT DOCUMENTS

WO 2006/125474 A1 11/2006

*Primary Examiner* — Pierre-Louis Desir
*Assistant Examiner* — David Kovacek
(74) *Attorney, Agent, or Firm* — Wolf, Greenfield & Sacks, P.C.

(57) ABSTRACT

A method for execution on a server for serving presence information, the method for providing dynamically loaded speech recognition parameters to a speech recognition engine, can be provided. The method can include storing at least one rule for selecting speech recognition parameters, wherein a rule comprises an if-portion including criteria and a then-portion specifying speech recognition parameters that must be used when the criteria is met. The method can further include receiving notice that a speech recognition session has been initiated between a user and the speech recognition engine. The method can further include selecting a first set of speech recognition parameters responsive to executing the at least one rule and providing to the speech recognition engine the first set of speech recognition parameters for performing speech recognition of the user.

20 Claims, 3 Drawing Sheets

(56) References Cited

U.S. PATENT DOCUMENTS

| | | | |
|---|---|---|---|
| 2001/0056346 A1* | 12/2001 | Ueyama et al. | 704/246 |
| 2002/0046023 A1* | 4/2002 | Fujii et al. | 704/231 |
| 2002/0091515 A1* | 7/2002 | Garudadri | 704/231 |
| 2002/0091527 A1* | 7/2002 | Shiau | 704/270.1 |
| 2002/0173958 A1* | 11/2002 | Asano et al. | 704/251 |
| 2003/0037053 A1* | 2/2003 | Wang et al. | 707/100 |
| 2003/0050783 A1* | 3/2003 | Yoshizawa | 704/270.1 |
| 2003/0125945 A1* | 7/2003 | Doyle | 704/246 |
| 2003/0125955 A1* | 7/2003 | Arnold et al. | 704/270.1 |
| 2004/0148164 A1* | 7/2004 | Baker | 704/231 |
| 2005/0043956 A1* | 2/2005 | Aoyama et al. | 704/276 |
| 2005/0091057 A1* | 4/2005 | Phillips et al. | 704/270.1 |
| 2005/0102142 A1* | 5/2005 | Soufflet et al. | 704/246 |
| 2005/0261901 A1* | 11/2005 | Davis et al. | 704/235 |
| 2006/0034257 A1* | 2/2006 | Hollatz et al. | 370/352 |
| 2006/0123113 A1* | 6/2006 | Friedman | 709/226 |
| 2006/0155733 A1* | 7/2006 | John et al. | 707/101 |
| 2006/0190268 A1* | 8/2006 | Wang | 704/275 |
| 2006/0195323 A1* | 8/2006 | Monne et al. | 704/270.1 |
| 2006/0253444 A1* | 11/2006 | O'Toole et al. | 707/9 |
| 2006/0259555 A1* | 11/2006 | Hassounah et al. | 709/206 |
| 2007/0038436 A1* | 2/2007 | Cristo et al. | 704/9 |
| 2007/0112571 A1* | 5/2007 | Thirugnana | 704/270 |
| 2007/0239454 A1* | 10/2007 | Paek et al. | 704/257 |
| 2008/0103771 A1* | 5/2008 | Jouvet et al. | 704/250 |
| 2008/0208589 A1* | 8/2008 | Cross et al. | 704/275 |
| 2009/0106028 A1* | 4/2009 | Dhanakshirur et al. | 704/270.1 |

* cited by examiner

AUTOMATED TUNING OF SPEECH RECOGNITION PARAMETERS

BACKGROUND OF THE INVENTION

1. Field of the Invention

The present invention relates to automatic speech recognition, and more particularly relates to the tuning of speech recognition parameters for automatic speech recognition engines.

2. Description of the Related Art

Speech recognition (or SR) systems translate audio information into text information. An SR system processes incoming speech and uses speech recognition parameters (i.e., grammars, weights, etc.) to determine the natural language represented by the speech. In an SR system, speech recognition occurs based on a score describing a phonetic similarity to the natural language options in a set of grammars. A grammar is an available set of natural language options in a particular context. A grammar can represent a set of words or phrases. When speech is recognized as one of the words or phrases in a grammar, the SR system returns the natural language interpretation of the speech.

The SR system computes scores for the options of the grammars for speech. The score of an option is based on two kinds of information: acoustic information and grammatical information. A probabilistic framework for the acoustic information defines the "acoustic score" as the likelihood that a particular option was spoken, given the acoustic properties of an utterance. The grammatical information biases some options in relation to others. In a probabilistic framework, the grammatical information is defined as a probability associated with each option. These probabilities are referred to herein as "grammar weights", or simply "weights". The score computed by the SR system for an option, given an utterance, is a combination of the acoustic score and the grammar weight. The SR system chooses the grammar option having the highest score as the natural language interpretation of the speech. Increasing the grammar weight of an option (and thus increasing the score of the option) therefore increases the chance of that option being chosen as the natural language interpretation of a given utterance.

An application author, which is a voice application programmer, defines the grammars for a speech engine. Grammar weights are defined by application authors in the course of the application programming process and are therefore alterable by the application author. The grammar weights of grammars may be determined (either assigned or tuned) according to a specific method to maximize the abilities of the SR system to correctly interpret speech. However, because acoustic scores are modeled by the manufacturer of the speech recognition software, the acoustic scores are typically fixed in a particular version of the speech recognition software. This can produce obstacles during maintenance, re-deployment, piloting and other phases of production. For example, if an SR system is originally deployed for recognizing residential addresses and then is later deployed for recognizing business addresses, the speech recognition parameters, which were originally hard-coded into the application, must then be re-worked or modified to recognize business addresses. This can be time-consuming and costly. It is therefore desirable for an SR system to have easy access to speech recognition parameters so as to allow for customization to different environments independent of applications.

Therefore, a need arises for a more efficient method for providing access to speech recognition parameters to speech recognition systems that are deployed in different environments.

BRIEF SUMMARY OF THE INVENTION

Embodiments of the present invention address deficiencies of the art in respect to automatic speech recognition and provide a novel and non-obvious method, system and computer program product for providing dynamically loaded speech recognition parameters. In one embodiment of the invention, a method for execution on a server for serving presence information, the method for providing dynamically loaded speech recognition parameters to a speech recognition engine, can be provided. The method can include storing at least one rule for selecting speech recognition parameters, wherein a rule comprises an if-portion including criteria and a then-portion specifying speech recognition parameters that must be used when the criteria is met. The method can further include receiving notice that a speech recognition session has been initiated between a user and the speech recognition engine. The method can further include selecting a first set of speech recognition parameters responsive to executing the at least one rule and providing to the speech recognition engine the first set of speech recognition parameters for performing speech recognition of the user.

In another embodiment of the invention, a method for execution on a server for serving presence information, the method for providing dynamically loaded speech recognition parameters to a speech recognition engine, is provided. The method can include storing at least one rule for selecting speech recognition parameters, wherein a rule comprises an if-portion including criteria and a then-portion specifying speech recognition parameters that must be used when the criteria is met. The method can further include storing periodically updated metadata about a plurality of speech recognition engines and selecting a first speech recognition engine based on most recently stored metadata. The method can further include receiving notice that a speech recognition session has been initiated between a user and the first speech recognition engine and executing the at least one rule. The method can further include selecting a first set of speech recognition parameters responsive to executing the at least one rule and providing to the first speech recognition engine the first set of speech recognition parameters for performing speech recognition of the user.

In yet another embodiment of the invention, a computer system comprising a server for serving presence information, the server for providing dynamically loaded speech recognition parameters to a speech recognition engine, can be provided. The system can include a repository for storing at least one rule for selecting speech recognition parameters, wherein a rule comprises an if-portion including criteria and a then-portion specifying speech recognition parameters that must be used when the criteria is met. The system further can include a processor configured for receiving notice that a speech recognition session has been initiated between a user and the speech recognition engine and executing the at least one rule. The processor may further be configured for selecting a first set of speech recognition parameters responsive to executing the at least one rule and providing to the speech recognition engine the first set of speech recognition parameters for performing speech recognition of the user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for providing dynamically loaded speech recognition parameters. The method can include storing at least one rule for selecting speech recognition parameters, wherein a rule comprises an if-portion including criteria and a then-portion specifying speech recognition parameters that must be used when the criteria is met. The method can further include initiating a speech recognition session between with a user and the speech recognition engine and executing the at least one rule. The method can further include selecting a first set of speech recognition parameters responsive to executing the at least one rule and loading the first set of speech recognition parameters for performing speech recognition of the user.

Figure 1:
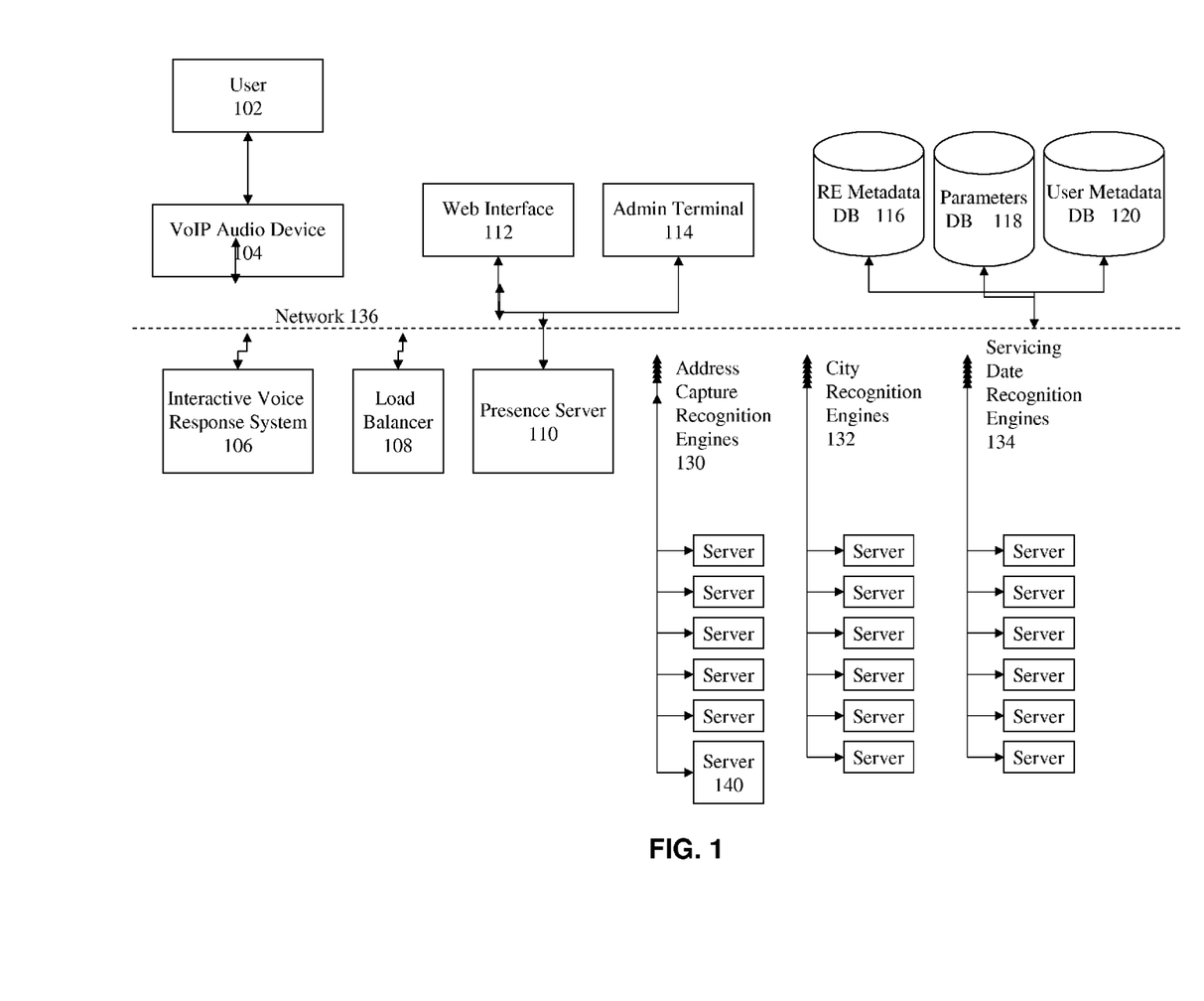
FIG. 1 is a block diagram illustrating a network architecture for a system providing for dynamically loaded speech recognition parameters, according to one embodiment of the present invention.

FIG. 1 is a block diagram illustrating a network architecture for a system providing for dynamically loaded speech recognition parameters, according to one embodiment of the present invention. The system of FIG. 1 includes a user 102 utilizing a VoIP audio device 104 to conduct a SIP call. The Session Initiation Protocol (SIP) is an application-layer control (signaling) protocol for creating, modifying, and terminating sessions with one or more participants. It can be used to create two-party, multiparty, or multicast sessions that include Internet telephone calls, multimedia distribution, and multimedia conferences. The device 104 is connected to a network 106, which may be a packet switched network such as the global Internet, a private Intranet or the like.

FIG. 1 also includes an interactive voice response (IVR) system 106 connected to the network 106. An IVR is a phone technology that allows a computer to detect voice and touch tones using a normal phone call. The IVR system 106 can respond with pre-recorded or dynamically generated audio to further direct callers on how to proceed. The load balancer 108, also connected to network 106, comprises a server which services the requests of its clients, i.e., device 104, by forwarding requests to other servers, such as speech recognition servers 130, 132 and 134. The device 104 connects to the load balancer 108, requesting speech recognition services available from speech recognition servers 130, 132 and 134. The load balancer 108 provides the resource by connecting to the specified servers 130, 132 and 134 and requesting the service on behalf of the client, device 104. The load balancer 108 may also serve load balancing purposes by distributing the speech recognition processing burden among appropriate speech recognition servers 130, 132 and 134.

Also connected to network 106 are three sets of speech recognition servers 130, 132, 134. Each type of speech recognition, such as recognizing names as opposed to numbers, necessitates a specific set of grammar and weights. Thus, each set of speech servers handle a particular type of speech recognition. The first set of speech recognition servers 130 comprise a set of servers that provide speech recognition for address capture, wherein an address, whether residential or business, is recognized. The second set of speech recognition servers 132 comprises a set of servers that provide speech recognition for cities. The third set of speech recognition servers 134 comprises a set of servers that provide speech recognition for a date. Note that although FIG. 1 shows only three sets of speech recognition servers, the present invention supports any number of speech recognition servers serving various types of speech recognition.

The speech recognition servers 130, 132, 134 are configured to be used according to their abilities. Thus, a particular speech recognition server may be used for one turn. A turn is one segment of a speech recognition session. A speech recognition session may comprise various segments wherein each segment is directed towards recognizing a particular type of data. For example, a speech recognition application may be programmed to recognize an address and a city. The aforementioned speech recognition session may be divided into two segments or turns wherein the first turn is serviced by an address speech recognition server (found in group 130) and the second turn is serviced by a city speech recognition server (found in group 132).

Also connected to the network 106 is the presence server 110. The presence server 110 serves presence information, which is a status indicator that conveys ability and willingness of an entity, such as a user or a server, to communicate or operate normally. Presence information, and related metadata, is provided by each server 130, 132, and 134 to presence server 110. The presence information, and related metadata, is stored in appropriate databases 116, 118 and can be made available for distribution to other entities. Users and servers may publish presence information and related metadata to indicate its current communication and performance status. This published information informs others that wish to contact or interact with an entity of his availability and willingness to communicate and process information.

In an embodiment of the present invention, presence server 110 is a modified commercially available presence server such as the IBM WebSphere Presence Server available from International Business Machines Corp. of Armonk, N.Y. Conventionally, a presence server serves presence information, which is a status indicator that conveys ability and willingness of a potential communication partner. A user's client provides presence information via a network connection to a presence server, which stores the presence information in a user's personal availability record and can be made available for distribution to other users to convey his availability for communication. The presence server 110 can be a commercially available presence server modified to serve additional information, besides presence information, as described below. The presence server 110 can further be modified to provide additional functions described below.

In an embodiment of the present invention, each speech recognition server 130, 132, 134 publishes a variety of data to the presence server 110, including load data, supported grammars, availability, health, supported languages and acoustic model characteristics. Speech recognition servers may also publish performance data to the presence server 110 such as recognition accuracy, grammar usage and the like. The above data published by speech recognition servers may be stored in a recognition engine metadata database 116. A user 102, as well as other users, may publish to the presence server 110 such data as the current physical location of the user 102, such as an address, a sphere indicator, such as "at home," "in an office," or "driving in a car," and availability, which indicates whether the user 102 is currently available for a SIP Session. The above data published by users may be stored in a user metadata database 120.

Stored in the parameters database 118 are speech recognition parameters such as grammars, weights, accuracy settings, threshold values and sensitivity values. Also stored in parameters database 118 are rules for adjusting the speech recognition parameters. A rule comprises an if-portion including criteria that must be met and a then-portion specifying speech recognition parameters that must be used when the criteria is met. Factors that may be taken into account when determining whether criteria is met include time of day, recognition accuracy of the speech recognition engine, and grammar usage of the speech recognition engine. For example, if a rules states a recognition accuracy is below 40% and the current recognition accuracy of a recognition engine server is currently 33%, then the criteria is met. Next, the then-portion of the rule dictates that a specified set of speech recognition parameters are selected.

Also connected to network 106 are web interface 112 and administrative terminal 114. These interfaces are used to prompt an administrator for input in response to a situation, such as low recognition accuracy. In this process, the administrator provides commands to the system of FIG. 1 for adjusting speech recognition parameters.

Figure 2:
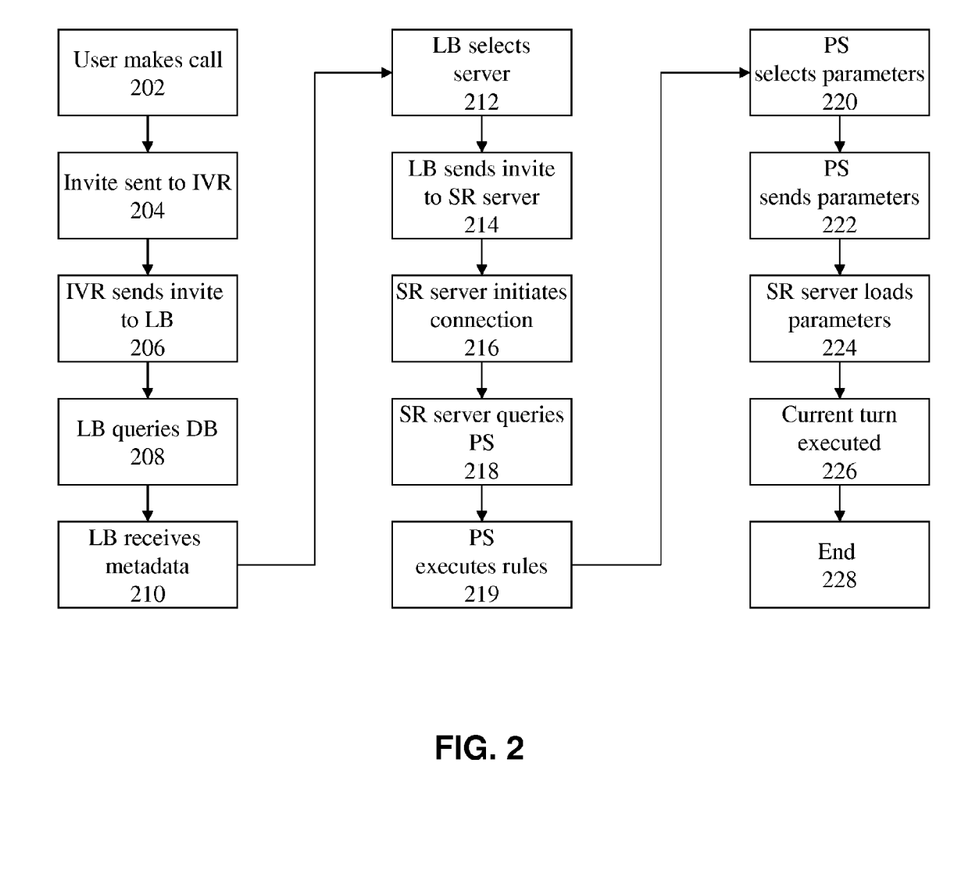
FIG. 2 is a flow chart depicting a general process for providing dynamically loaded speech recognition parameters, according to one embodiment of the present invention.

FIG. 2 is a flow chart depicting a general process for providing dynamically loaded speech recognition parameters, according to one embodiment of the present invention. The following flow chart depicts the process executed by the system of FIG. 1 for choosing an appropriate speech recognition engine for servicing a user at a particular turn further and dynamically providing speech recognition tuning parameters based on collected metadata. In step 202, the user 102 uses his VoIP device 104 to call into the IVR 106. In step 204, the device 104 sends a SIP invite to the IVR 106.

In an optional step after step 204, the IVR 106 gathers metadata about the user 102. The gathered metadata may include the current physical location of the user 102, such as an address, a sphere indicator, such as "at home," "in an office," or "driving in a car," and availability, which indicates whether the user 102 is currently available for a SIP Session. The user metadata may be gathered from a separate entity such as a location server. In a second optional step, the gathered metadata is stored by the presence server 100 in the user metadata database 120.

In step 206, the IVR 106 routes the original invite to the load balancer 108. In step 208, the load balancer 108 queries, via the presence server 110, the recognition engine metadata database 116 for the most recent metadata about the recognition engine servers 130, 132 and 134. In step 210, the load balancer 108 receives the metadata about the recognition engine servers 130, 132 and 134 from the recognition engine metadata database 116.

In step 212, the load balancer 108 selects a recognition engine server within the servers 130, 132 and 134 based on the received metadata. The load balancer 108 may take a variety of factors into account when making the selection of step 212. The load balancer 108 takes into account the grammars and languages supported by each recognition engine server within the servers 130, 132 and 134. For example, if the IVR 106 is currently capturing addresses in English, only those recognition engine servers servicing address capture in English are considered. The load balancer 108 also takes into account load data, availability data and health data for each recognition engine server so as to determine which servers currently have enough bandwidth to service the user 102 at the highest capacity. The load balancer 108 also takes into account acoustic model characteristics so as to determine which server uses the appropriate model to service the speech recognition type of the current turn.

In step 214, the load balancer 108 routes the original invite to the selected recognition engine server, in this case recognition engine server 140. In step 216, recognition engine server 140 receives the original invite from the device 104 and initiates a SIP connection with the device 104. In step 218, the recognition engine server 140 queries the presence server 110 for the appropriate speech recognition parameters. In step 219, the presence server 110 executes the rules in parameter database 118 to determine the appropriate speech recognition parameters for loading into the recognition engine server 140. The process of executing a rule is described in greater detail below.

As described earlier, a rule comprises an if-portion including criteria that must be met and a then-portion specifying speech recognition parameters that must be used when the criteria is met. Step 219 involves reading metadata from the parameters database 118, wherein the metadata includes a least one value for at least one of time of day, recognition accuracy of the speech recognition engine, and grammar usage of the speech recognition engine. Next, it is determined whether the metadata meets criteria of the rule. For example, if the rules states a time of day between 9 am and 5 pm, then if the current time of the day is 1 pm, then the criteria is met. In another example, if the rule states that the recognition accuracy is below 40% and the current recognition accuracy of the recognition engine server 140 is currently 33%, then the criteria is met. Next, assuming the criteria of the if-portion of the rule is met, the then-portion of the rule dictates that a specified set of speech recognition parameters are selected.

In an optional step after step 219, the presence server 110 takes additional user metadata, from database 120, into account when selecting speech recognition parameters as in step 219. For example, if the user metadata in database 120 indicates that the user 102 is driving during the SIP session, then appropriate speech recognition parameters that optimize recognition during driving are selected.

In step 220, the presence server 110 retrieves the selected speech recognition parameters form the parameter database 118. In step 222, the presence server 110 sends the retrieved speech recognition parameters to the recognition engine server 140. In step 224, recognition engine server 140 receives and loads the speech recognition parameters. In step 226, the current turn is executed and in step 228, the control flow of FIG. 2 ends.

Figure 3:
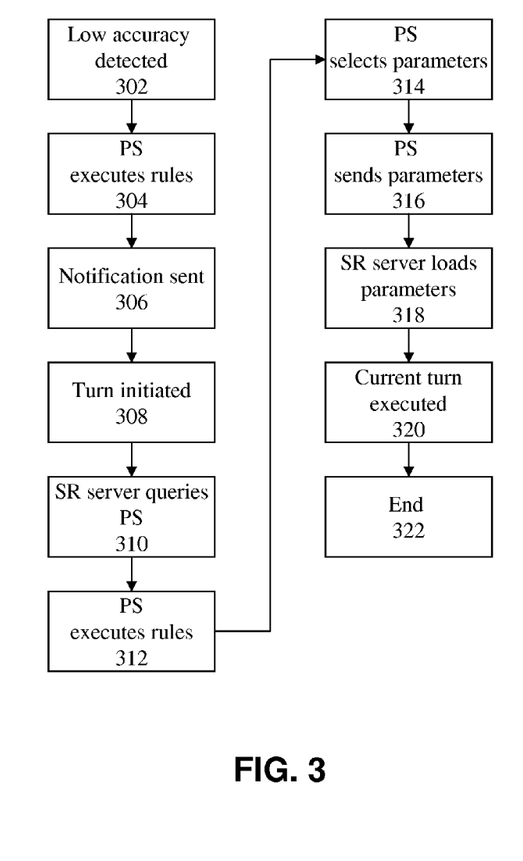
FIG. 3 is a flow chart depicting a process for adjusting speech recognition parameters according to a rule, according to one embodiment of the present invention.

FIG. 3 is a flow chart depicting a process for adjusting speech recognition parameters according to a rule, according to one embodiment of the present invention. The following flow chart depicts the process executed by the system of FIG. 1 for adjusting speech recognition parameters before a turn based on collected metadata. In step 302, it is determined, by an entity such as presence server 110, that a recognition engine server, such as server 140, is achieving low recognition accuracy. As described earlier, each recognition engine server reports related metadata to the RE metadata database 116. Thus, step 302 may occur in between turns wherein the presence server 110 queries the RE metadata database 116 for metadata about the speech recognition engine servers.

In step 304, the presence server 110 executes the rules in parameter database 118 to determine the appropriate speech recognition parameters for loading into the recognition engine server 140. The process of executing a rule is described in greater detail above. In this example, a rule is executed wherein a grammar weight is changed due to the low recognition accuracy.

In an optional step after step 304, an administrator, connected via web interface 112 or administrative terminal 114, is prompted for input in response to the low recognition accuracy. In this alternative, the administrator provides commands to the system of FIG. 1 for adjusting speech recognition parameters so as to resolve the low speech recognition accuracy.

In step 306, a notification is sent via presence server 110 by recognition engine server 140. The notification is sent to all other recognition engine servers 130, 132 and 134. The notification may be a standard text message sent via TCP/IP or SIP NOTIFY events. The notification states that new speech recognition parameters are available and shall be loaded at the next turn. In step 308, the next turn is initiated.

In step 310, the recognition engine server 140 queries the presence server 110 for the appropriate speech recognition parameters. In step 312, the presence server 110 executes the rules in parameter database 118 to determine the appropriate speech recognition parameters for loading into the recognition engine server 140. The process of executing a rule is described in greater detail above.

In step 314, the presence server 110 retrieves the selected speech recognition parameters form the parameter database 118. In step 316, the presence server 110 sends the retrieved speech recognition parameters to the recognition engine server 140. In step 318, recognition engine server 140 receives and loads the speech recognition parameters. In step 320, the current turn is executed and in step 322, the control flow of FIG. 3 ends.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for providing dynamically loaded speech recognition parameters from a server to a speech recognition engine, comprising:
(A) with the server, on a first occasion after a first speech recognition session has been initiated between a first user and the speech recognition engine:
executing at least one rule for selecting speech recognition parameters for use by a speech recognition engine, wherein the at least one rule comprises an if-portion including criteria and a then-portion specifying values of speech recognition parameters that must be used by the speech recognition engine for evaluating natural language options of a grammar when the criteria is met;
selecting first values of a set of speech recognition parameters responsive to executing the at least one rule on the first occasion; and
communicating to the speech recognition engine the selected first values of the set of speech recognition parameters for performing speech recognition of the first user on the first occasion;
(B) with the speech recognition engine, for a first utterance by the first user on the first occasion:
receiving the selected first values of the set of speech recognition parameters from the server;
using the received selected first values of the set of speech recognition parameters to evaluate the acoustic properties of the first utterance to determine first acoustic scores for the natural language options of the grammar;
combining the determined first acoustics scores for the natural language options of the grammar with grammar weights for the natural language options of the grammar to compute first computed scores for the natural language options of the grammar by using grammar weights for the natural language options of the grammar to bias the determined first acoustic scores; and
choosing the natural language option of the grammar having the highest first computed score as the natural language interpretation of the first utterance;
(C) with the server, on a second occasion after a second speech recognition session has been initiated between a second user and the speech recognition engine:
executing the at least one rule;

selecting second values of the set of speech recognition parameters responsive to executing the at least one rule on the second occasion; and communicating to the speech recognition engine the selected second values of the set of speech recognition parameters for performing speech recognition of the second user on the second occasion; and (D) with the speech recognition engine, for a second utterance by the second user on the second occasion:

receiving the selected second values of the set of speech recognition parameters from the server;

using the received selected second values of the set of speech recognition parameters to evaluate the acoustic properties of the second utterance to determine second acoustic scores for the natural language options of the grammar;

combining the determined second acoustics scores for the natural language options of the grammar with grammar weights for the natural language options of the grammar to compute second computed scores for the natural language options of the grammar by using grammar weights for the natural language options of the grammar to bias the determined second acoustic scores; and choosing the natural language option of the grammar having the highest second computed score as the natural language interpretation of the second utterance;

wherein the set of speech recognition parameters comprises one or both of an accuracy setting and a sensitivity value.

2. The method of claim 1, wherein:

the criteria of the at least one rule includes at least one value for time of day, recognition accuracy of the speech recognition engine, and/or grammar usage of the speech recognition engine.

3. The method of claim 1, wherein the set of speech recognition parameters further comprises grammar weights of the grammar.

4. The method of claim 2, wherein the step of executing the at least one rule comprises:

reading metadata including at least one value for time of day, recognition accuracy of the speech recognition engine, and/or grammar usage of the speech recognition engine; and determining that the metadata meets criteria of the at least one rule.

5. The method of claim 4, wherein:

the step of selecting the first values of the set of speech recognition parameters comprises selecting values of the set of speech recognition parameters identical to first values of the speech recognition parameters specified by a then-portion of the at least one rule; and the step of selecting the second values of the set of speech recognition parameters comprises selecting values of the set of speech recognition parameters identical to second values the speech recognition parameters specified by a then-portion of the at least one rule.

6. A method for providing dynamically loaded speech recognition parameters from a server to speech recognition engines, comprising:

(A) with the server, on a first occasion after a first speech recognition session has been initiated between a first user and a first speech recognition engine, the first speech recognition engine having been selected from among a plurality of speech recognition engines for use during the first speech recognition session based on most recently stored metadata about the plurality of speech recognition engines:

executing at least one rule for selecting speech recognition parameters for use by a speech recognition engine, wherein the at least one rule comprises an if-portion including criteria and a then-portion specifying values of speech recognition parameters that must be used by the speech recognition engine for evaluating natural language options of a grammar when the criteria is met;

selecting first values of a set of speech recognition parameters responsive to executing the at least one rule on the first occasion; and communicating to the first speech recognition engine the selected first values of the set of speech recognition parameters for performing speech recognition of the first user on the first occasion;

(B) with the first speech recognition engine, for a first utterance by the first user on the first occasion:

receiving the selected first values of the set of speech recognition parameters from the server;

using the received selected first values of the set of speech recognition parameters to evaluate the acoustic properties of the first utterance to determine first acoustic scores for the natural language options of the grammar;

combining the determined first acoustics scores for the natural language options of the grammar with grammar weights for the natural language options of the grammar to compute first computed scores for the natural language option of the grammar by using grammar weights for the natural language options of the grammar to bias the determined first acoustic scores; and choosing the natural language option of the grammar having the highest first computed score as the natural language interpretation of the first utterance;

(C) with the server, on a second occasion after a second speech recognition session has been initiated between a second user and the first speech recognition engine, the first speech recognition engine having been selected from among the plurality of speech recognition engines for use during the second speech recognition session based on most recently stored metadata about the plurality of speech recognition engines:

executing the at least one rule;

selecting second values of the set of speech recognition parameters responsive to executing the at least one rule on the second occasion; and communicating to the first speech recognition engine the selected second values of the set of speech recognition parameters for performing speech recognition of the second user on the second occasion;

(D) with the first speech recognition engine, for a second utterance by the second user on the second occasion:

receiving the selected second values of the set of speech recognition parameters from the server;

using the received selected second values of the set of speech recognition parameters to evaluate the acoustic properties of the second utterance to determine second acoustic scores for the natural language options of the grammar;

combining the determined second acoustics scores for the natural language options of the grammar with grammar weights for the natural language options of the grammar to compute second computed scores for the natural language option of the grammar by using grammar weights for the natural language options of the grammar to bias the determined second acoustic scores; and choosing the natural language option of the grammar having the highest second computed score as the natural language interpretation of the second utterance;

(E) with the server, on a third occasion after a third speech recognition session has been initiated between a third user and a second speech recognition engine, the second speech recognition engine having been selected from among the plurality of speech recognition engines for use during the third speech recognition session based on most recently stored metadata about the plurality of speech recognition engines:

executing the at least one rule;

selecting third values of the set of speech recognition parameters responsive to executing the at least one rule on the third occasion; and communicating to the second speech recognition engine the selected third values of the set of speech recognition parameters for performing speech recognition of the third user on third occasion;

(F) with the second speech recognition engine, for a third utterance by the third user on the third occasion:

receiving the selected third values of the set of speech recognition parameters from the server;

using the received selected third values of the set of speech recognition parameters to evaluate the acoustic properties of the second utterance to determine third acoustic scores for the natural language options of the grammar;

combining the determined third acoustics scores for the natural language options of the grammar with grammar weights for the natural language options of the grammar to compute third computed scores for the natural language option of the grammar by using grammar weights for the natural language options of the grammar to bias the determined third acoustic scores; and choosing the natural language option of the grammar having the highest third computed score as the natural language interpretation of the third utterance;

(G) with the server, on a fourth occasion after a fourth speech recognition session has been initiated between a fourth user and the second speech recognition engine, the second speech recognition engine having been selected from among the plurality of speech recognition engines for use during the fourth speech recognition session based on most recently stored metadata about the plurality of speech recognition engines:

executing the at least one rule;

selecting a fourth set of speech recognition parameters responsive to executing the at least one rule on the fourth occasion; and communicating to the second speech recognition engine the selected fourth values of the set of speech recognition parameters for performing speech recognition of the user on the fourth occasion; and (H) with the second speech recognition engine, for a fourth utterance by the fourth user on the fourth occasion:

receiving the selected fourth values of the set of speech recognition parameters from the server;

using the received selected fourth values of the set of speech recognition parameters to evaluate the acoustic properties of the fourth utterance to determine fourth acoustic scores for the natural language options of the grammar;

combining the determined fourth acoustics scores for the natural language options of the grammar with grammar weights for the natural language options of the grammar to compute fourth computed scores for the natural language option of the grammar by using grammar weights for the natural language options of the grammar to bias the determined fourth acoustic scores; and choosing the natural language option of the grammar having the highest fourth computed score as the natural language interpretation of the fourth utterance;

wherein the set of speech recognition parameters comprises one or both of an accuracy setting and a sensitivity value.

7. The method of claim 6, wherein the criteria of the at least one rule includes at least one value for one or more of time of day, recognition accuracy of a speech recognition engine, and grammar usage of a speech recognition engine.

8. The method of claim 6, wherein the set of speech recognition parameters further comprises grammar weights of the grammar.

9. The method of claim 7, wherein the metadata comprises load data, supported grammars, availability, health, supported languages, and/or acoustic model characteristics.

10. The method of claim 9, wherein the step of executing the at least one rule on the first occasion comprises:

reading metadata including at least one value for time of day, recognition accuracy of the first speech recognition engine, and/or grammar usage of the first speech recognition engine; and determining that the metadata meets criteria of the at least one rule.

11. The method of claim 10, wherein:

the step of selecting the first values of the set of speech recognition parameters comprises selecting values of the set of speech recognition parameters identical to first values of the speech recognition parameters specified by a then-portion of the at least one rule;

the step of selecting the second values of the set of speech recognition parameters comprises selecting values of the set of speech recognition parameters identical to second values of the speech recognition parameters specified by a then-portion of the at least one rule;

the step of selecting the third values of the set of speech recognition parameters comprises selecting values of the set of speech recognition parameters identical to third values of the speech recognition parameters specified by a then-portion of the at least one rule; and the step of selecting the fourth values of the set of speech recognition parameters comprises selecting values of the set of speech recognition parameters identical to fourth values of the speech recognition parameters specified by a then-portion of the at least one rule.

12. A computer system, comprising:

a server:

a speech recognition engine; and a repository for storing at least one rule for selecting speech recognition parameters for use by a speech recognition engine, wherein a rule comprises an if-portion including criteria and a then-portion specifying values of speech recognition parameters that must be used for evaluating natural language options of a grammar when the criteria is met;

wherein the server is configured to, on a first occasion after a first speech recognition session has been initiated between a first user and the speech recognition engine:
  execute the at least one rule;
  select first values of a set of speech recognition parameters responsive to executing the at least one rule on the first occasion; and
  communicate to the speech recognition engine the selected first values of the set of speech recognition parameters for performing speech recognition of the first user on the first occasion;
wherein the speech recognition engine is configured to, for a first utterance by the first user on the first occasion:
  receive the selected first values of the set of speech recognition parameters from the server;
  use the received selected first values of the set of speech recognition parameters to evaluate the acoustic properties of the first utterance to determine first acoustic scores for the natural language options of the grammar;
  combine the determined first acoustics scores for the natural language options of the grammar with grammar weights for the natural language options of the grammar to compute first computed scores for the natural language options of the grammar by using grammar weights for the natural language options of the grammar to bias the determined first acoustic scores; and
  choose the natural language option of the grammar having the highest first computed score as the natural language interpretation of the first utterance;
wherein the server is further configured to, on a second occasion after a second speech recognition session has been initiated between a second user and the speech recognition engine:
  execute the at least one rule;
  select second values of the set of speech recognition parameters responsive to executing the at least one rule on the second occasion; and
  communicate to the speech recognition engine the selected second values of the set of speech recognition parameters for performing speech recognition of the second user on the second occasion;
wherein the speech recognition engine is further configured to, for a second utterance by the second user on the second occasion:
  receive the selected second values of the set of speech recognition parameters from the server;
  use the received selected second values of the set of speech recognition parameters to evaluate the acoustic properties of the second utterance to determine second acoustic scores for the natural language options of the grammar; and
  combine the determined second acoustics scores for the natural language options of the grammar with grammar weights for the natural language options of the grammar to compute second computed scores for the natural language options of the grammar by using grammar weights for the natural language options of the grammar to bias the determined second acoustic scores; and
  choose the natural language option of the grammar having the highest second computed score as the natural language interpretation of the second utterance; and
wherein the set of speech recognition parameters comprises one or both of an accuracy setting and a sensitivity value.

13. The computer system of claim 12, wherein the criteria of the at least one rule includes at least one value for time of day, recognition accuracy of the speech recognition engine, and/or grammar usage of the speech recognition engine.

14. The computer system of claim 12, wherein the set of speech recognition parameters further comprises grammar weights of the grammar.

15. The computer system of claim 12, further comprising:
  a load balancing server for distributing speech recognition sessions among a plurality of speech recognition engines based on availability of the speech recognition engines.

16. A non-transitory computer-readable medium encoded with a plurality of instructions that, when executed by at least one processor, cause the at least one processor to perform a method for providing dynamically loaded speech recognition parameters from a server to a speech recognition engine, comprising:
  (A) executing, on a first occasion after a first speech recognition session has been initiated between a first user and the speech recognition engine, at least one rule for selecting speech recognition parameters for use by the speech recognition engine, wherein the at least one rule comprises an if-portion including criteria and a then-portion specifying values of speech recognition parameters that must be used by the speech recognition engine for evaluating natural language options of a grammar when the criteria is met;
  (B) selecting first values of a set of speech recognition parameters responsive to executing the at least one rule on the first occasion;
  (C) communicating to the speech recognition engine the selected first values of the set of speech recognition parameters for performing speech recognition of the first user on the first occasion;
  wherein communication of the selected first values of the set of speech recognition parameters from the server to the speech recognition engine allows the speech recognition engine, for a first utterance by the first user on the first occasion, to:
    receive the selected first values of the set of speech recognition parameters from the server:
    use the received selected first values of the set of speech recognition parameters to evaluate the acoustic properties of the first utterance to determine first acoustic scores for the natural language options of the grammar;
    combine the determined first acoustics scores for the natural language options of the grammar with grammar weights for the natural language options of the grammar to compute first computed scores for the natural language options of the grammar by using grammar weights for the natural language options of the grammar to bias the determined first acoustic scores; and
    choose the natural language option of the grammar having the highest first computed score as the natural language interpretation of the first utterance;
  (D) executing the at least one rule on a second occasion after a second speech recognition session has been initiated between a second user and the speech recognition engine;
  (E) selecting second values of the set of speech recognition parameters responsive to executing the at least one rule on the second occasion; and
  (F) communicating to the speech recognition engine the selected second values of the set of speech recognition parameters for performing speech recognition of the second user on the second occasion;

wherein communication of the selected second values of the set of speech recognition parameters from the server to the speech recognition engine allows the speech recognition engine, for a second utterance by the second user on the second occasion, to:

receive the selected second values of the set of speech recognition parameters from the server;

use the received selected second values of the set of speech recognition parameters to evaluate the acoustic properties of the second utterance to determine second acoustic scores for the natural language options of the grammar;

combine the determined second acoustics scores for the natural language options of the grammar with grammar weights for the natural language options of the grammar to compute second computed scores for the natural language options of the grammar by using grammar weights for the natural language options of the grammar to bias the determined second acoustic scores; and choose the natural language option of the grammar having the highest second computed score as the natural language interpretation of the second utterance; and wherein the set of speech recognition parameters comprises one or both of an accuracy setting and a sensitivity value.

17. The computer-readable medium of claim 16, wherein the criteria of the at least one rule includes at least one value for time of day, recognition accuracy of the speech recognition engine, and/or grammar usage of the speech recognition engine.

18. The computer-readable medium of claim 16, wherein the set of speech recognition parameters further comprises grammar weights of the grammar.

19. A non-transitory computer-readable medium encoded with a plurality of instructions that, when executed by at least one processor, cause the at least one processor to perform a method for providing dynamically loaded speech recognition parameters from a server to speech recognition engines, comprising:

(A) executing the at least one rule on a first occasion after a first speech recognition session has been initiated between a first user and a first speech recognition engine, the first speech recognition engine having been selected from among a plurality of speech recognition engines for use during the first speech recognition session based on most recently stored metadata about the plurality of speech recognition engines, the at least one rule allowing selection of speech recognition parameters for use by the plurality of speech recognition engines, wherein the at least one rule comprises an if-portion including criteria and a then-portion specifying values of speech recognition parameters that must be used by a speech recognition engine for evaluating natural language options of a grammar when the criteria is met;

(B) selecting first values of a set of speech recognition parameters responsive to executing the at least one rule on the first occasion;

(C) communicating to the first speech recognition engine the selected first values of the set of speech recognition parameters for performing speech recognition of the first user on the first occasion;

wherein communication of the selected first values of the set of speech recognition parameters from the server to the first speech recognition engine allows the first speech recognition engine, for a first utterance by the first user on the first occasion, to:

receive the selected first values of the set of speech recognition parameters from the server;

use the received selected first values of the set of speech recognition parameters to evaluate the acoustic properties of the first utterance to determine first acoustic scores for the natural language options of the grammar;

combine the determined first acoustics scores for the natural language options of the grammar with grammar weights for the natural language options of the grammar to compute first computed scores for the natural language option of the grammar by using grammar weights for the natural language options of the grammar to bias the determined first acoustic scores; and choose the natural language option of the grammar having the highest first computed score as the natural language interpretation of the first utterance;

(D) executing the at least one rule on a second occasion after a second speech recognition session has been initiated between a second user and the first speech recognition engine, the first speech recognition engine having been selected from among the plurality of speech recognition engines for use during the second speech recognition session based on most recently stored metadata about the plurality of speech recognition engines;

(E) selecting second values of the set of speech recognition parameters responsive to executing the at least one rule on the second occasion;

(F) communicating to the first speech recognition engine the selected second values of the set of speech recognition parameters for performing speech recognition of the second user on the second occasion;

wherein communication of the selected second values of the set of speech recognition parameters from the server to the first speech recognition engine allows the first speech recognition engine, for a second utterance by the second user on the second occasion, to:

receive the selected second values of the set of speech recognition parameters from the server;

use the received selected second values of the set of speech recognition parameters to evaluate the acoustic properties of the second utterance to determine second acoustic scores for the natural language options of the grammar; and combine the determined second acoustics scores for the natural language options of the grammar with grammar weights for the natural language options of the grammar to compute second computed scores for the natural language option of the grammar by using grammar weights for the natural language options of the grammar to bias the determined second acoustic scores; and choose the natural language option of the grammar having the highest second computed score as the natural language interpretation of the second utterance;

(G) executing the at least one rule on a third occasion after a third speech recognition session has been initiated between a third user and a second speech recognition engine, the second speech recognition engine having been selected from among the plurality of speech recognition engines for use during the third speech recognition session based on most recently stored metadata about the plurality of speech recognition engines;

(H) selecting third values of the set of speech recognition parameters responsive to executing the at least one rule on the third occasion;

(I) communicating to the second speech recognition engine the selected third values of the set of speech recognition parameters for performing speech recognition of the third user on the third occasion;

wherein communication of the selected third values of the set of speech recognition parameters from the server to the second speech recognition engine allows the second speech recognition engine, for a third utterance by the third user on the third occasion, to:

receive the selected third values of the set of speech recognition parameters from the server:

use the received selected third values of the set of speech recognition parameters to evaluate the acoustic properties of the second utterance to determine third acoustic scores for the natural language options of the grammar;

combine the determined third acoustics scores for the natural language options of the grammar with grammar weights for the natural language options of the grammar to compute third computed scores for the natural language option of the grammar by using grammar weights for the natural language options of the grammar to bias the determined third acoustic scores; and choose the natural language option of the grammar having the highest third computed score as the natural language interpretation of the third utterance;

(J) executing the at least one rule on a fourth occasion after a fourth speech recognition session has been initiated between a fourth user and the second speech recognition engine, the second speech recognition engine having been selected from among the plurality of speech recognition engines for use during the fourth speech recognition session based on most recently stored metadata about the plurality of speech recognition engines;

(K) selecting fourth values of the set of speech recognition parameters responsive to executing the at least one rule on the fourth occasion; and (L) communicating to the second speech recognition engine the selected fourth values of the set of speech recognition parameters for performing speech recognition of the fourth user on the fourth occasion;

wherein communication of the selected fourth values of the set of speech recognition parameters from the server to the second speech recognition engine allows the second speech recognition engine, for a fourth utterance by the fourth user on the fourth occasion, to:

receive the selected fourth values of the set of speech recognition parameters from the server;

use the received selected fourth values of the set of speech recognition parameters to evaluate the acoustic properties of the fourth utterance to determine fourth acoustic scores for the natural language options of the grammar; and combine the determined fourth acoustics scores for the natural language options of the grammar with grammar weights for the natural language options of the grammar to compute fourth computed scores for the natural language option of the grammar by using grammar weights for the natural language options of the grammar to bias the determined fourth acoustic scores; and choose the natural language option of the grammar having the highest fourth computed score as the natural language interpretation of the fourth utterance; and wherein the set of speech recognition parameters comprises one or both of an accuracy setting and a sensitivity value.

20. The computer-readable medium of claim 19, wherein the set of speech recognition parameters further comprises grammar weights of the grammar.

\* \* \* \* \*